United States Patent
Koral et al.

(10) Patent No.: US 12,543,042 B2
(45) Date of Patent: Feb. 3, 2026

(54) PROTECTION AGAINST WIRELESS ACCESS POINT IMPERSONATION

(71) Applicant: AT&T Intellectual Property I, L.P., Atlanta, GA (US)

(72) Inventors: Yaron Koral, Cherry Hill, NJ (US); Shraboni Jana, Danville, CA (US); Kaustubh Joshi, Short Hills, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

(21) Appl. No.: 17/702,861

(22) Filed: Mar. 24, 2022

(65) Prior Publication Data
US 2023/0308878 A1    Sep. 28, 2023

(51) Int. Cl.
*H04W 12/122* (2021.01)
*H04L 9/40* (2022.01)
*H04W 12/128* (2021.01)

(52) U.S. Cl.
CPC ......... *H04W 12/122* (2021.01); *H04L 63/145* (2013.01); *H04L 63/1483* (2013.01); *H04W 12/128* (2021.01)

(58) Field of Classification Search
CPC .......... H04W 12/122; H04W 12/128; H04L 63/145; H04L 63/1483
See application file for complete search history.

(56) References Cited

U.S. PATENT DOCUMENTS

| | | | |
|---|---|---|---|
| 2012/0023552 A1* | 1/2012 | Brown | H04W 12/122 709/225 |
| 2013/0019298 A1* | 1/2013 | Jover Segura | H04L 63/1466 726/7 |
| 2013/0040603 A1* | 2/2013 | Stahlberg | H04L 63/14 455/410 |
| 2013/0097711 A1* | 4/2013 | Basavapatna | G06F 21/577 726/25 |

(Continued)

OTHER PUBLICATIONS

Ketkhaw, Apisak; Thipchaksurar, Sakchai; "Hidden Rogue Access Point Detection Technique for Wireless Local Area Networks," 21st International Computer Science and Engineering Conference (ICSEC), Bangkok, Thailand, Nov. 15-18, 2017, IEEE, 5 pages.*

(Continued)

*Primary Examiner* — Ictor Lesniewski
(74) *Attorney, Agent, or Firm* — Hartman & Citrin LLC

(57) ABSTRACT

An access point impersonation protection system ("the system") can scan for wireless network signals to detect a wireless network provided by a malicious access point. The system can collect a network feature associated with the wireless network. The system can analyze the network feature and can provide analysis results to a machine learning classifier. The machine learning classifier can assign a classification to the access point. The classification can be a benign classification indicative of the access point being benign. The classification can be a malicious classification indicative of the access point being malicious. The network feature can be an active time, an SSID name, a vendor, a model, a signal strength, an authentication requirement, or a (Continued)

combination thereof. The system can alert upon identifying a malicious access point and apply counter measures to prevent the malicious access point from causing harm to nearby devices.

20 Claims, 10 Drawing Sheets

(56) References Cited

U.S. PATENT DOCUMENTS

| | | | | |
|---|---|---|---|---|
| 2014/0177611 | A1* | 6/2014 | Corrales Lopez | H04W 88/08 370/338 |
| 2015/0082429 | A1* | 3/2015 | Rangarajan | H04W 12/122 726/23 |
| 2015/0139211 | A1* | 5/2015 | Ji | H04W 12/122 370/338 |
| 2016/0330229 | A1* | 11/2016 | Watson | H04L 63/1441 |
| 2017/0026859 | A1* | 1/2017 | Ahmadzadeh | H04W 24/08 |
| 2017/0126705 | A1* | 5/2017 | Mirashrafi | H04L 63/102 |
| 2018/0139719 | A1* | 5/2018 | Deshpande | H04W 64/003 |
| 2019/0021004 | A1* | 1/2019 | Shanmugavadivel | H04W 12/08 |
| 2019/0130019 | A1* | 5/2019 | De | H04L 67/1097 |
| 2019/0230103 | A1* | 7/2019 | Hart | H04L 43/10 |
| 2019/0380043 | A1* | 12/2019 | Hassan | G06F 21/552 |
| 2020/0162924 | A1* | 5/2020 | Desai | H04W 12/108 |
| 2020/0336914 | A1* | 10/2020 | Kaushik | H04W 64/003 |
| 2021/0204135 | A1* | 7/2021 | Cho | H04W 12/61 |
| 2021/0258791 | A1* | 8/2021 | Jochem Sanz | H04W 12/66 |
| 2023/0246939 | A1* | 8/2023 | Thompson | H04L 41/0843 709/224 |

OTHER PUBLICATIONS

Kuo, En-Chun; Chang, Ming-Sang; Kao, Da-Yu; "User-side evil twin attack detection using time-delay statistics of TCP connection termination," 20th International Conference on Advanced Communication Technology (ICACT), Chuncheon, Korea (South), Feb. 11-14, 2018, IEEE, pp. 211-216.*

Liu, Pengfei; Yang, Panlong; Song, Wen-Zhan; Yan, Yubo; Li, Xiang-Yang; "Real-time Identification of Rogue WiFi Connections Using Environment-Independent Physical Features," INFOCOM 2019—IEEE Conference on Computer Communications, Paris, France, Apr. 29-May 2, 2019, IEEE, pp. 190-198.*

* cited by examiner

PROTECTION AGAINST WIRELESS ACCESS POINT IMPERSONATION

BACKGROUND

Broadband Internet traffic has grown significantly in recent years. This growth has been fueled, in part, by a trend towards employers adopting work from home policies in light of the COVID-19 pandemic. As a result of this trend, Internet usage has shifted from enterprise and education networks to primarily consumer broadband networks. Internet service providers ("ISPs") should prioritize securing last hop network connectivity and provide ways for users to protect their personal information and devices.

While wired network connections, such as Ethernet, are still widely used, innovations in wireless technologies have enabled wireless networks, such as those based on WI-FI technologies, to provide network characteristics (e.g., latency and bandwidth) on par with their wired counterparts. Moreover, the prevalence of wireless devices, such as smartphones, tablets, and other computing devices, that rely solely on wireless network connectivity have further increased the usage of wireless network connections. As a result, traffic such as video streaming, music streaming, online gaming, and the like is rapidly moving to wireless networks for the performance and conveniences afforded by a wireless connection.

The proliferation of wireless networks presents an enticing target for attackers. An attacker can drive by a target location (e.g., a home or business), set up a dummy wireless access point, and hijack a target device by luring the target device to connect to the dummy wireless access point. Two of the most popular methods to execute this attack are known as Evil Twin and Karma attacks.

An attacker can execute an Evil Twin attack by choosing a name for the dummy wireless access point that already appears in a preferred networks list ("PNL") of the target device and using this name as the Service Set Identifier ("SSID") of the dummy wireless access point. The attacker can then pass by the target location and hijack the target device by making the target device switch from a legitimate network to a dummy network provided by the dummy wireless access point. Even if the attacker does not know an entry in the PNL of the target device, the attacker can use a set of common public SSIDs (e.g., "ssid," "FreeInternet," "Guest," and the like) that already may be in the PNL of the target device.

A Karma attack is similar to an Evil Twin attack. In a Karma attack, the attacker acquires the SSID through probe requests. Some wireless networks do not publish any SSIDs in an effort to avoid connection from unwanted guest devices. These wireless networks still publish radio parameters such as band and frequency. A device can send probe requests to these wireless networks to ask if the network is associated with one of the SSIDs from the PNL. An attacker can abuse this method by listening to probe requests and responding to one of the requested SSIDs.

SUMMARY

Concepts and technologies disclosed herein are directed to protection against wireless access point impersonation. According to one aspect of the concepts and technologies disclosed herein, an access point impersonation protection system can include a processor and a memory. The memory can include instructions that, when executed by the processor, cause the processor to perform operations. More particularly, the access point impersonation protection system can scan for wireless network signals to detect a wireless network provided by an access point. The access point impersonation protection system can collect a network feature associated with the wireless network. The access point impersonation protection system can analyze the network feature to determine analysis results and can provide the analysis results to a machine learning classifier. The machine learning classifier can assign, based at least in part upon the analysis results, a classification to the access point. The classification can be a benign classification indicative of the access point being benign. The classification can be a malicious classification indicative of the access point being malicious.

The network feature can be an active time. The access point impersonation protection system can determine whether the active time of the access point is below an active time threshold. In response to determining that the active time is below the active time threshold, the access point impersonation protection system can determine that the access point has a higher likelihood of being malicious than benign.

The network feature can be an SSID name. The access point impersonation protection system can determine whether the SSID name is a common public name. In response to determining that the SSID name is a common public name, the access point impersonation system can determine that the access point has a higher likelihood of being malicious than benign.

The network feature can be a vendor or model of the access point. The access point impersonation protection system can determine whether the vendor or the model of the access point is on a blacklist. In response to determining that the vendor or the model is on the black list, the access point impersonation protection system can determine that the access point has a higher likelihood of being malicious than benign.

The network feature can be an authentication requirement. The access point impersonation protection system can determine whether the authentication requirement meets an authentication requirement minimum. In response to determining that the authentication requirement does not meet an authentication requirement minimum, the access point impersonation protection system can determine that the access point has a higher likelihood of being malicious than benign.

The network feature can be a signal strength. The access point impersonation protection system can determine whether the signal strength is above a signal strength threshold. In response to determining that the signal strength is above the signal strength threshold, the access point impersonation protection system can determine that the access point has a higher likelihood of being malicious than benign.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1A:
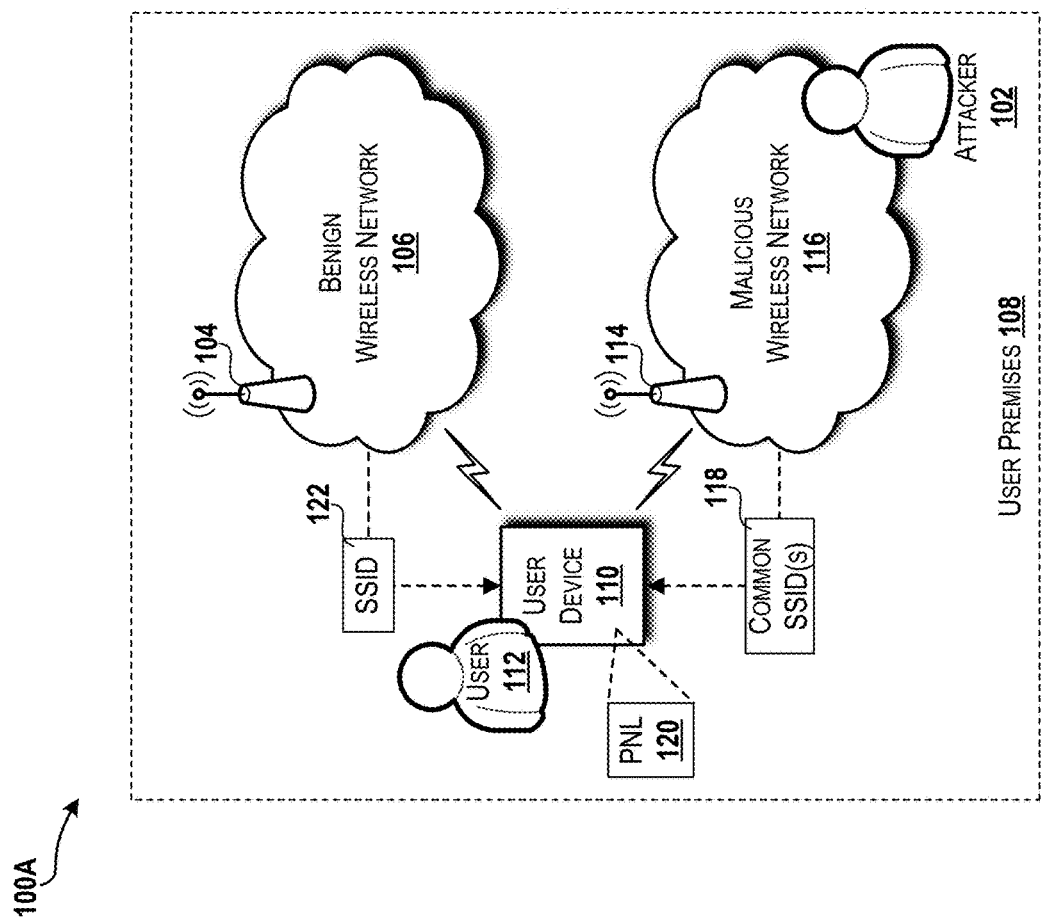
FIG. 1A is a block diagraming illustrating aspects of an operating environment in which an attacker can execute an Evil Twin attack for wireless access point impersonation.

The concepts and technologies disclosed herein are directed to protection against wireless access point impersonation, such as via Evil Twin and Karma attacks. In some embodiments, an access point impersonation protection system is provided as part of a residential gateway, which can be or can include a modem, router, switch, and/or other networking functionality. In other embodiments, the access point impersonation protection system is provided as a standalone system that can operate in communication with the residential gateway.

The access point impersonation protection system can include a detection component. The detection component can continuously map nearby wireless access points and associated wireless networks and collect network features. The network features can include an active time, an SSID name, a vendor and/or model (e.g., obtained from the basic service set identifier "BSSID" or media access control "MAC" address), an authentication requirement, or a signal strength. Each of these network features can be collected and analyzed. The analysis results can be sent to a machine learning classifier that can classify the access points as either benign or malicious.

The access point impersonation protection system can include a mitigation component. The mitigation component can alert users about a threat caused by a malicious wireless access point and can disable the malicious wireless access point. In some embodiments, an alert can be provided via an out-of-band mechanism such as an application installed on a device (e.g., a smartphone or tablet). The alert can be sent to a set of devices to ensure that the alert can reach at least one device that the malicious wireless access point did not compromise. Once an alert is received, the user can manually disconnect the affected device(s) from the malicious wireless access point. Alternatively, the alert can trigger an automatic disconnect function to automatically disconnect the affected device(s) from the malicious wireless access point. Moreover, since the attacker should be located nearby (in order to execute the attack), the user can be alerted to investigate (e.g., identify a suspicious vehicle parked in front of the user's home or work) and/or report the attacker to law enforcement.

A cyber-attack, in general, is intended to be covert and avoid physical contact. Thus, when attackers realize that they were detected, they would most likely avoid contact and leave. In the case that a malicious wireless access point was identified and was able to convince one or more target devices to connect to it, the mitigation component can apply an active interference module. The active interference module can use two main techniques that are aimed at interfering with the attacker to establish constant communication with the target devices. The first interference technique can include having the interference module connect to the malicious wireless access point as a target device and send messages via the control channel. By sending many requests and responding slowly to the malicious wireless access point messages, the control channel is overloaded and the malicious wireless access point would fail to accept connection requests from the home devices. The second interference technique can cause interference with specific messages communicated to home devices from the malicious wireless access point. By identifying these messages, the interference module can send messages that would make it impossible for the malicious wireless access point to decode the messages. In this manner, the malicious wireless access point cannot extract sensitive information from the target devices it hijacked. The active interference module can issue an alert to the user. The user can check the area for a suspicious vehicle and/or person, which may cause the attacker to walk away. This interference process assumes a short period of a few minutes until the attacker gives up and leaves.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for protecting against wireless access point impersonation will be described.

Turning now to FIG. 1A, a block diagram illustrating aspects of an operating environment 100A in which an attacker 102 can execute an Evil Twin attack to impersonate a wireless access point (shown as "benign wireless access point 104") that provides a wireless network (shown as "benign wireless network 106") for a user premises 108 will be described. The attacker 102 may be human or an artificial intelligence entity. The attacker 102 may be stationary or in motion. The attacker 102 may be on foot or in a vehicle (e.g., parked or drive-by). The benign wireless network 106 can be a wireless local area network ("WLAN"). As such, the benign wireless access point 104 may operate in accordance with one or more Institute of Electrical and Electronics Engineers ("IEEE") 802.11X standards (referred to herein collectively as "WI-FI").

The attacker 102 can position themselves within or near the user premises 108 (e.g., parked in a vehicle on a street near the user's home) such that a user device 110 associated with a user 112 may connect to a malicious wireless access point 114 instead of the benign wireless access point 104. The malicious wireless access point 114 can provide a malicious wireless network 116 through which the attacker 102 can gain access to the user device 110 through which the attacker 102 can obtain personal identifying information (e.g., name, address, social security number, telephone number, and the like), financial information (e.g., bank account numbers, credit card numbers, and the like), and/or other information about the user 112, their family and/or friends, the user device 110, other devices (not shown), other networks (not shown), and the like. Although not shown in the illustrated example, the attacker 102 may utilize one or more devices and/or systems in addition to the malicious wireless access point 114 to execute an Evil Twin attack on the user device 110.

The user premises 108 may be referred to herein as a home or work of the user 112, although the user premises 108 may be any location in which the benign wireless network 106 and the user device 110 exist. The user device 110 may be a mobile device such as a smartphone or tablet. The user device 110 may be a computing device such as a personal computer (e.g., laptop or desktop). The user device 110 may be a media device such as a video streaming device or an audio streaming device. The user device 110 may be a video game device such as a stationary or portable video game console. The user device 110 can be any other device that includes one or more WLAN components capable of connecting to one or more wireless access points such as the benign wireless access point 104 and the malicious wireless access point 114.

The attacker 102 can program the malicious wireless access point 114 to broadcast multiple common SSID(s) 118 in an attempt to lure the user device 110 to connect to the malicious wireless access point 114 via a common SSID 118 that is stored in a preferred network list ("PNL") 120 instead of an SSID 122 associated with the benign wireless network 106. The attacker 102 can take advantage of common SSID(s) 118 that the user device 110 may have connected to in the past, such as those typically used for public WI-FI service offered by municipalities, theme parks, stores, restaurants, libraries, businesses, and the like.

Figure 1B:
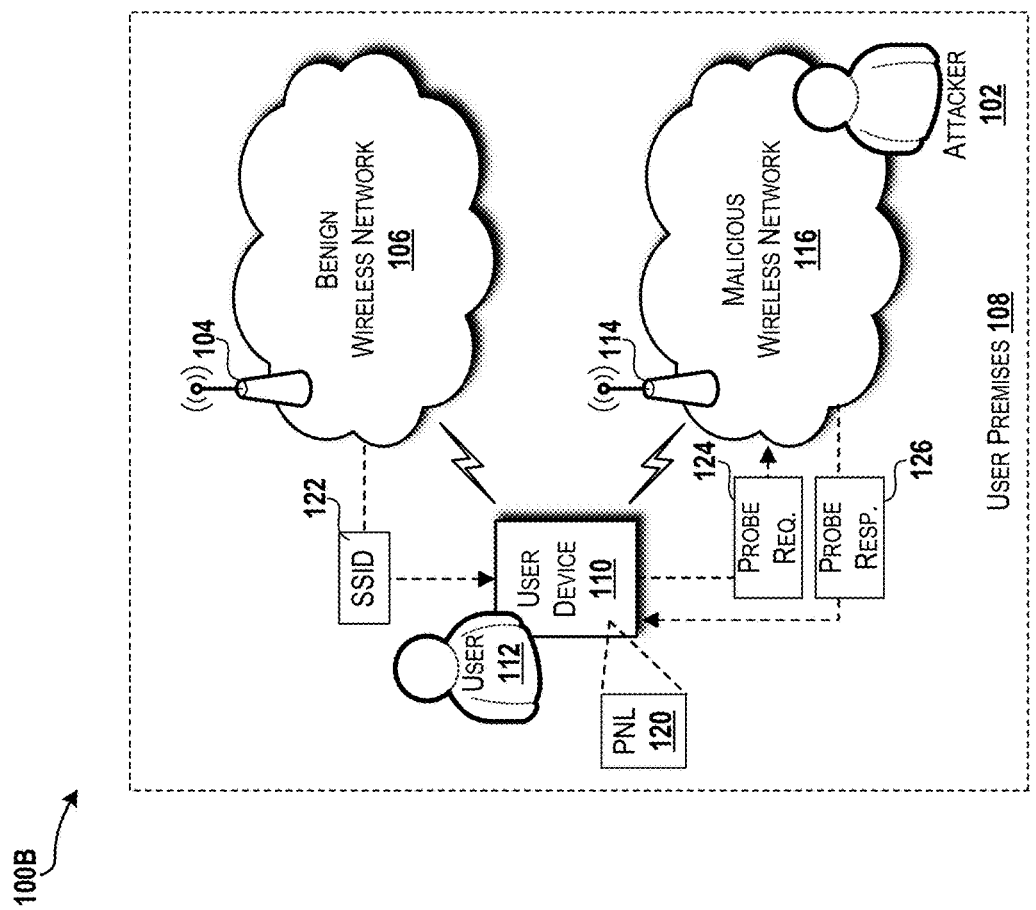
FIG. 1B is a block diagraming illustrating aspects of an operating environment in which an attacker can execute a Karma attack for wireless access point impersonation.

Turning now to FIG. 1B, a block diagram illustrating aspects of an operating environment 100B in which the attacker 102 can execute a Karma attack to impersonate the benign wireless access point 104 that provides the benign wireless network 106 for the user premises 108 will be described. In a Karma attack, the attacker 102 can obtain the SSID 122 of the benign wireless network 106 via one or more probe requests 124. The Karma attack may be used if a wireless access point, such as the benign wireless access point 104, does not publish its SSID (e.g., the SSID 122) as a means of protection to avoid unwanted guest devices viewing the SSID attempting to connect. Nevertheless, a wireless access point may still publish its radio parameters such as band and frequency. Devices, such as the user device 110, can send probe requests 124 to a wireless access point asking if the wireless access point is associated with one of the SSIDs in the PNL 120. In the illustrated example, the attacker 102 abuses this method by listening to the probe requests 124 and responding, via a probe response 126, with one of the requested SSIDs. The user device 110, in turn, would attempt to connect to the malicious wireless access point 114.

Figure 1C:
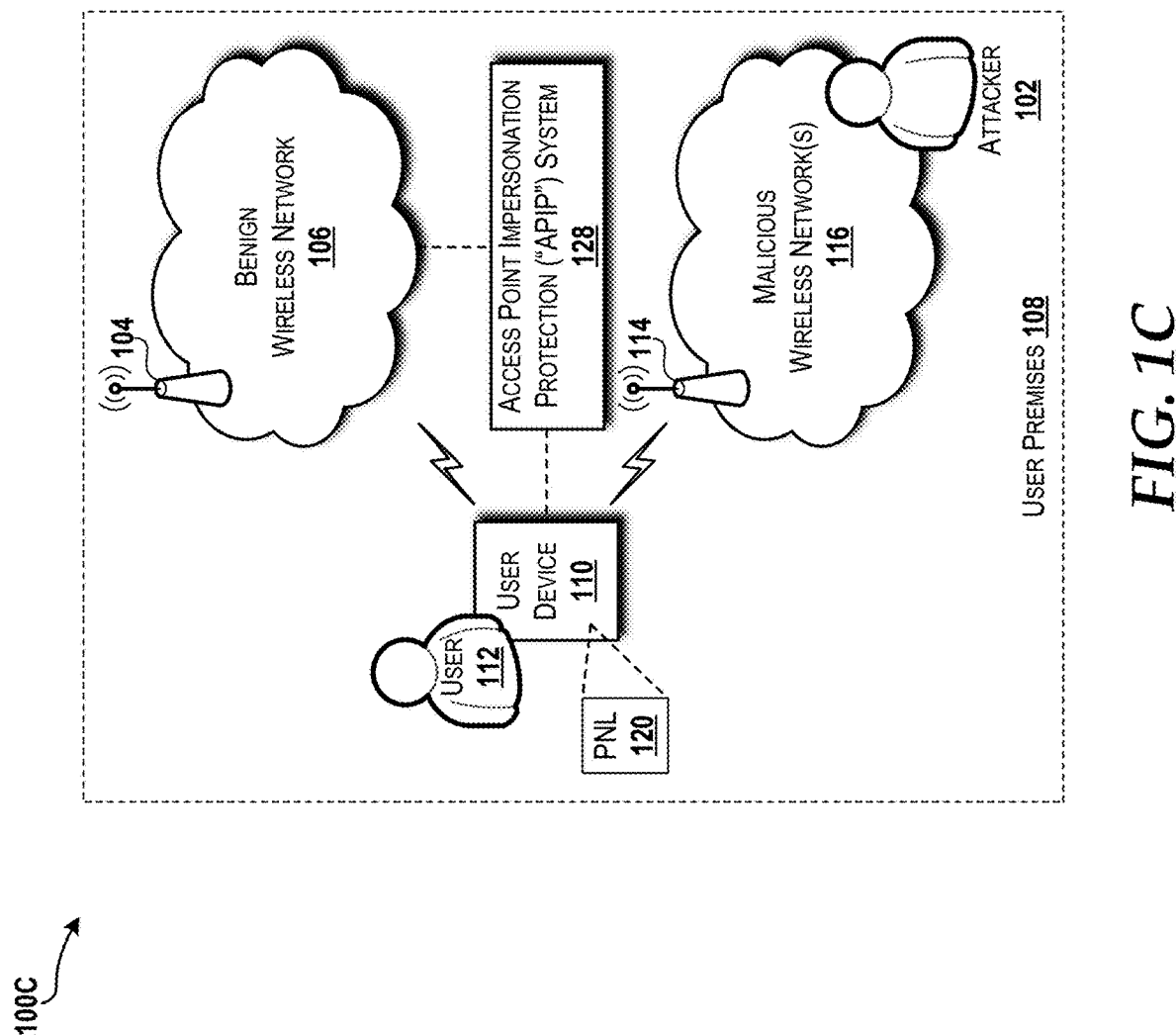
FIG. 1C is a block diagram illustrating aspects of an illustrative operating environment implementing an access point impersonation protection system to protect against attacks such as Evil Twin and Karma attacks, according to an illustrative embodiment of the concepts and technologies disclosed herein.

Turning now to FIG. 1C, a block diagram illustrating aspects of an illustrative operating environment 100C implementing an access point impersonation protection ("APIP") system 128 to protect against attacks, such as Evil Twin and Karma attacks, will be described, according to an illustrative embodiment of the concepts and technologies disclosed herein. The APIP system 128 can be provided as part of a residential gateway, which can be or can include a modem, router, switch, and/or other networking functionality. Alternatively, the APIP system 128 can be provided as a stand-alone system that can operate in communication with a residential gateway, modem, router, switch, and/or other network function.

The APIP system 128 can perform detection operations. The APIP system 128 can scan for nearby networks, such as the benign wireless network 106 and the malicious wireless network(s) 116 in the illustrated example. Once found, the APIP system 128 can collect one or more network features about these networks. The network features can include an active time, an S SID name, a vendor and/or model (e.g., obtained from the basic service set identifier "BSSID" or media access control "MAC" address), an authentication requirement, or a signal strength. Each of these network features can then be analyzed, the results of which can be sent to a machine learning classifier that can classify the networks as either benign or malicious.

The APIP system 128 also can perform mitigation operations. For example, the APIP system 128 can alert the user 112 about a threat caused by the malicious wireless access point 114 and actively attempt to disable the malicious wireless access point 114. In some embodiments, an alert can be provided via an out-of-band mechanism such as an application installed on the user device 110. The alert can be sent to a set of devices (e.g., the user device 110 and one or more other devices) to ensure that the alert can reach at least one device that the malicious wireless access point 114 did not compromise. Once an alert is received, the user 112 can manually disconnect the affected device(s) from the malicious wireless access point 114. Alternatively, the alert can trigger an automatic disconnect function to automatically disconnect the affected device(s) from the malicious wireless access point 114. Moreover, since the attacker 102 should be located nearby (in order to execute the attack), the user 112 can be alerted to investigate (e.g., identify a suspicious vehicle parked in front of the user's home or work) and/or report the attacker 102 to law enforcement. The APIP system 128 and specific components thereof will now be described with reference to FIG. 2.

Figure 2:
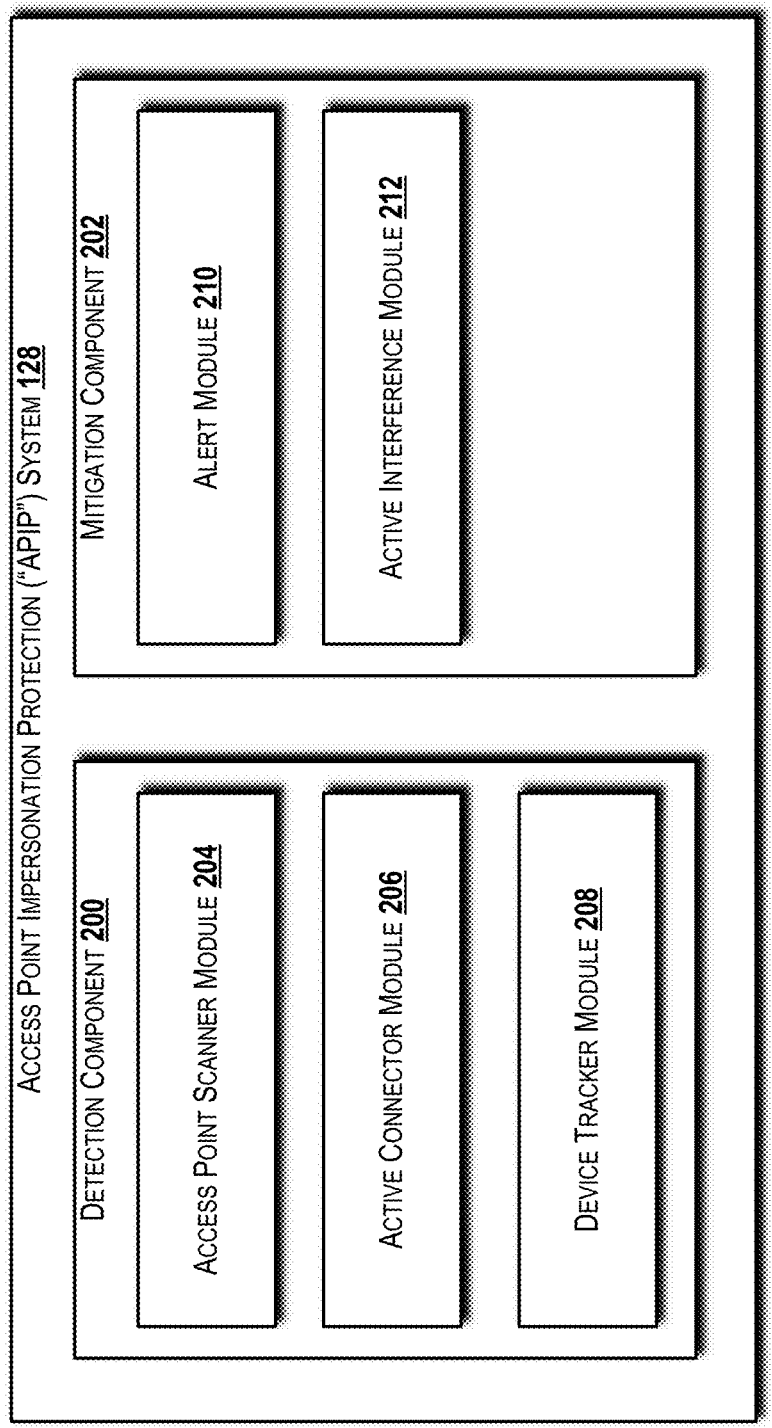
FIG. 2 is a block diagram illustrating an example access point impersonation system, according to an illustrative embodiment of the concepts and technologies disclosed herein.

Turning now to FIG. 2, a block diagram illustrating an example APIP system 128 will be described, according to an illustrative embodiment of the concepts and technologies disclosed herein. The illustrated APIP system 128 includes a detection component 200 and a mitigation component 202. The detection component 200 includes an access point scanner module 204, an active connector module 206, and a device tracker module 208. The mitigation component 202 includes an alert module 210 and an active interference module 212.

Figure 3:
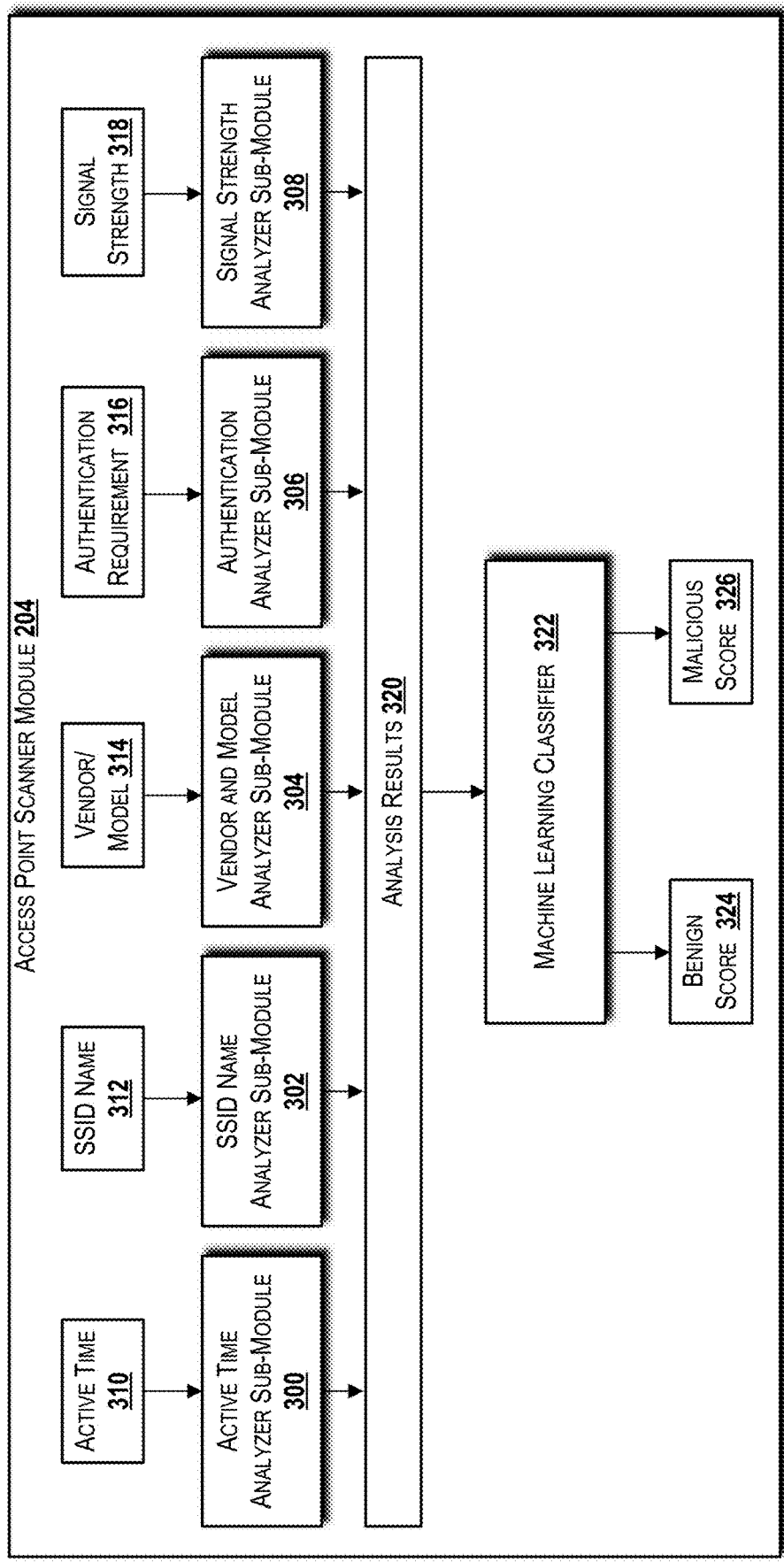
FIG. 3 is a block diagram illustrating an example access point scanner module, according to an illustrative embodiment of the concepts and technologies disclosed herein.

The access point scanner module 204 continuously scans for nearby networks, such as the benign wireless network 106 and the malicious wireless network(s) 116 in the illustrated example. When a network is found, the access point scanner module 204 collects one or more network features about that network. The network features can include an active time, an SSID name, a vendor and/or model (e.g., obtained from the basic service set identifier "BSSID" or media access control "MAC" address), an authentication requirement, or a signal strength. Each of these network features can then be analyzed. In some embodiments, such as shown in FIG. 3, a dedicated analyzer is used for each network feature type. Results of the analyses can then be sent a machine learning classifier (best shown in FIG. 3) to classify the access points as either benign or malicious. The intuition behind each dedicated analyzer will be described below with reference to FIG. 3.

The active connector module 206 acts as a device that attempts to connect to any access point (e.g., the malicious wireless access point 114) that is classified as malicious (i.e., suspicious). The active connector module 206 can analyze the connection to determine whether or not authentication was required. The active connector module 206 also can determine whether the access point acted according to the modus operandi of a Karma attack by responding positively to the probe request 124 with a random SSID name. If the active connector module 206 is successful, the active connector module 206 can further analyze any communication with the access point. More specifically, the active connector module 206 can act as a honey pot by exposing some sensitive information and monitoring attempts from the access point to access the information. For example, the malicious wireless access point 114 may try to scan the device (i.e., the active connector module 206) for open ports or default passwords. By observing such an activity, the active connector module 206 can mark the access point as malicious.

The device tracker module 208 can correlate the appearances of nearby suspicious access points with devices that disconnected from the APIP system 128 simultaneously. For example, if a new access point appears and three devices connected to the benign wireless network 106 disconnect, the new access point can be marked suspicious of hijacking these three devices.

The mitigation component 202 can use a combination of alerts to alert the user 112 about a threat and mitigation actions to disable the malicious wireless access point 114 or otherwise attempt to mitigate its effects. As such, the alert module 210 can generate alert(s) directed to the user 112. In some embodiments, the alert(s) can be sent using an out of band mechanism, such as an application installed on the user device 110 or another device (e.g., a smartphone associated with the user 112). In some embodiments, the alert(s) can be sent to a set of devices to ensure that an alert would reach at least one device that the malicious wireless access point 114 did not compromise. In response to an alert, the user 112 can manually disconnect the affected device(s) (e.g., the user device 110) from the malicious wireless access point 114.

A cyber-attack, in general, is intended to be covert and avoid physical contact. Thus, when the attacker 102 realizes that they were detected, they would most likely avoid contact and leave. In the case that the malicious wireless access point 114 was identified and was able to convince one or more target devices, such as the user device 110, to connect to it, the mitigation component 202 can apply the active interference module 212. The active interference module 212 can use two main techniques that are aimed at interfering with the attacker 102 to establish constant communication with the target devices. The first interference technique can include having the active interference module 212 connect to the malicious wireless access point 114 as a target device and send messages via a control channel. By sending many requests and responding slowly to the malicious wireless access point 114 messages, the control channel is overloaded and the malicious wireless access point 114 would fail to accept connection requests from the target devices. The second interference technique can cause interference with specific messages communicated to target devices from the malicious wireless access point 114. By identifying these messages, the active interference module 212 can send messages that would make it impossible for the malicious wireless access point 114 to decode the messages. In this manner, the malicious wireless access point 114 cannot extract sensitive information from the target devices it hijacked. The mitigation component 202 can issue an alert to the user 112 as described above. The user 112 can check the area for a suspicious vehicle and/or person, which may cause the attacker 102 to leave the user premises 108. This interference process assumes a short period of a few minutes until the attacker 102 gives up and leaves.

Turning now to FIG. 3, the access point scanner module 204 and its components will be described, according to an illustrative embodiment of the concepts and technologies disclosed herein. As described above, the access point scanner module 204 can utilize dedicated analyzers to analyze different network feature types. In the illustrated example, the access point scanner module 204 includes an active time analyzer sub-module 300, an SSID name analyzer sub-module 302, a vendor and model analyzer sub-module 304, an authentication analyzer sub-module 306, and a signal strength analyzer sub-module 308. Additional dedicated analyzers can be added to analyze network features not specifically described herein.

The active time analyzer sub-module 300 can receive as input an active time 310. The attacker 102 would typically operate the malicious wireless access point 114 for a short period of time. For example, the attacker 102 may drive by the user premises 108, hijack the user device 110, install some malware, and leave. On the contrary, the benign wireless access point 104 tends to be active for days to months. The active time analyzer sub-module 300 can determine whether the active time 310 is representative of the typical active time of the benign wireless access point 104 (e.g., days or months) or whether the active time 310 is abnormal (e.g., a few minutes).

The SSID name analyzer sub-module 302 can receive as input an SSID name 312. The SSID name analyzer sub-module 302 can maintain a list of common SSID names such as those used for public access points found in hotels, restaurants, retail stores, libraries, and other establishments that use the same SSID name for multiple locations. For example, a common SSID name is the establishment name followed by "guest," "free," "visitor," or a similar moniker.

The list of common SSID names can be updated from time to time. For example, as the user device 112 connects to public access points and the PNL 120 is populated, the common SSIDs 118 can be added to the list maintained by the SSID name analyzer sub-module 302. If an access point is detected in an unusual location (e.g., a hotel guest WI-FI SSID in the street in front of the user's home) with one of the common SSID names in the list, the detection component 200 can classify the access point as malicious with a higher certainty. Another case would be that the access point does not reveal its SSID name. This is considered normal but would be verified with some active measures explained below. A third case would be that the access point uses the exact name as the SSID name 312 of the benign wireless access point 104, which appears to be a likely spoofing case. There is a chance that a new access point popped up in a very close location with a similar SSID. Still, this analysis depends on the uniqueness of the SSID name 312. Some router vendors may use a default SSID name, making this case less suspicious.

The vendor and model analyzer sub-module 304 can receive as input a vendor/model 314 of the access point being analyzed. Some access point models are more common than others. In addition, there are equipment vendors and models used for network scanning that are infamously known as popular for attackers. The vendor and model analyzer sub-module 304 can maintain a blacklist for vendors and/or models of access points that are known for being popular for attackers and/or for other reasons. In response to determining that the vendor or the model is on the black list, the vendor and model analyzer sub-module 304 can determine that the access point has a higher likelihood of being malicious than benign.

The authentication analyzer sub-module 306 can determine an authentication requirement 316 via a test regarding whether the access point requires authentication or not. The attacker 102 that tries to lure devices to connect to the malicious wireless access point 114 would try to make it as easy as possible. Thus, no password or a naïve password would make the access point more suspicious than an access point that uses a password and some strong encryption.

The signal strength analyzer sub-module 308 can receive as input a signal strength 318. The attacker 102 would try to use a signal with superior quality in an attempt to convince devices, such as the user device 112, to choose the malicious wireless access point 114 over the benign wireless access point 104. Conversely, if a new access point appears with poor signal quality, the access point will not pose much risk of convincing devices to connect to it.

Results of the aforementioned sub-modules 300, 302, 304, 306, 308 analyses are shown collectively as analysis results 320. The analysis results 320 are provided to a machine learning classifier 322 that, in turn, scores the subject access point with a benign score 324 and a malicious score 326. The machine learning classifier 322 classifies the subject access point as benign or malicious based upon the greater of these two scores. Additional details about how the machine learning classifier 322 can be implemented will be described in detail with reference to FIG. 8.

Figure 4:
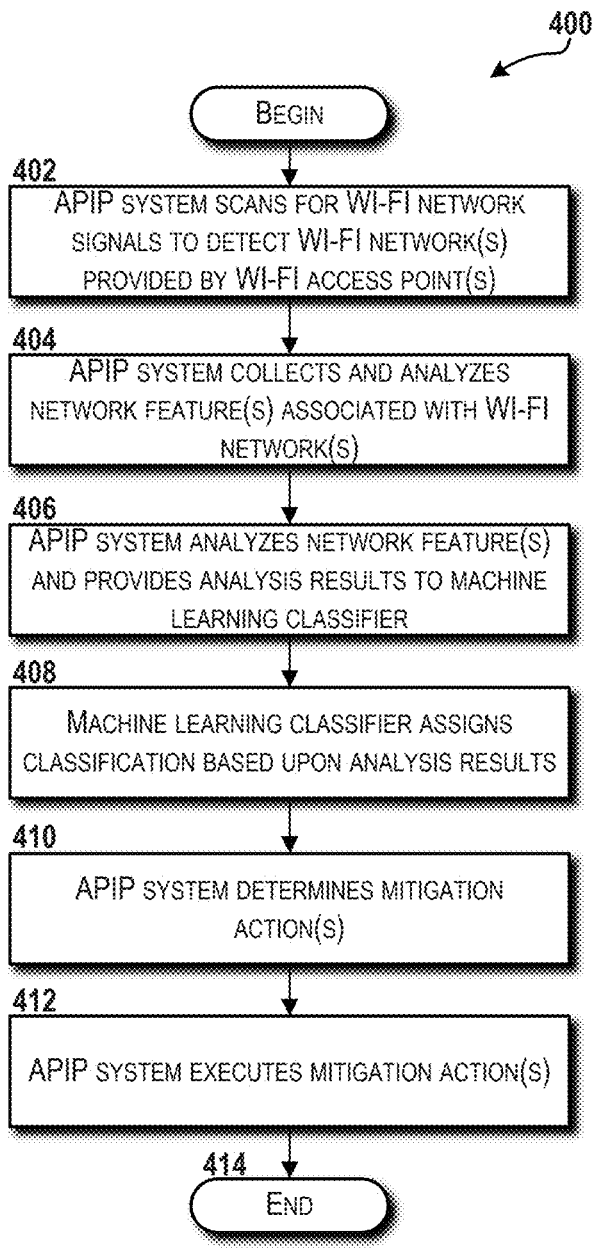
FIG. 4 is a flow diagram illustrating aspects of a method for protecting against wireless access point impersonation, according to an illustrative embodiment of the concepts and technologies disclosed herein.

Turning now to FIG. 4, a flow diagram illustrating aspects of a method 400 for protecting against wireless access point impersonation will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 400 begins and proceeds to operation 402. At operation 402, the APIP system 128 scans, via the access point scanner module 204, for WI-FI network signals to detect one or more WI-FI networks provided by one or more WI-FI access points. In the example shown in FIG. 1C, the APIP system 128 can scan for WI-FI network signals to detect the benign wireless network 106 provided by the benign wireless access point 104 and the malicious wireless network 116 provided by the malicious wireless access point 114. In practice, the APIP system 128 may detect WI-FI network signals from multiple benign wireless networks 106 and/or multiple malicious wireless networks 116.

From operation 402, the method 400 proceeds to operation 404. At operation 404, the APIP system 128 collects, via the access point scanner module 204, one or more network features associated with the WI-FI networks detected during operation 402. The network features can include the active time 310, the SSID name 312, the vendor/model 314, the authentication requirement 316 (e.g., password requirement or default password), and the signal strength 318. Additional or alternative network features may be used based upon the needs of a given implementation. As such, the example network features described herein should not be construed as being limiting in any way.

From operation 404, the method 400 proceeds to operation 406. At operation 406, the APIP system 128 analyzes, via one or more dedicated analyzers of the access point scanner module 204, the network feature(s). For example, in the illustrated embodiment shown in FIG. 3, the active time 310 network feature can be analyzed by the active time analyzer sub-module 300; the SSID name 312 network feature can be analyzed by SSID name analyzer sub-module 302; the vendor/model 314 network feature can be analyzed by the vendor and model analyzer sub-module 304; the authentication requirement 316 network feature can be analyzed by the authentication analyzer sub-module 306; and the signal strength 318 network feature can be analyzed by the signal strength analyzer sub-module 308. The APIP system 128 can be configured with additional or alternative dedicated analyzers to accommodate other network feature types. Also at operation 406, the APIP system 128 can provide the analysis results 320 to the machine learning classifier 322.

From operation 406, the method 400 proceeds to operation 408. At operation 408, the machine learning classifier 322 assigns a classification to each of the WI-FI access points based upon the analysis results 320. For example, the machine learning classifier 322 can determine, based at least in part upon the analysis results 320, the benign score 324 and the malicious score 326 for each of the WI-FI access points and assign the classification type based on the highest score.

From operation 408, the method 400 proceeds to operation 410. At operation 410, the APIP system 128 determines, via the mitigation component 202, one or more mitigation actions to be taken. The method 400 assumes that at least one of the WI-FI access points is classified as malicious, such as the malicious wireless access point 114 shown in FIG. 1C. The mitigation action(s) can be or can include an alert via the alert module 210 and/or a form of active interference via the active interference module 212.

From operation 410, the method 400 proceeds to operation 412. At operation 412, the APIP system 128 executes the mitigation action(s). In particular, the alert module 210 can generate alert(s) directed to the user 112. In some embodiments, the alert(s) can be sent using an out of band mechanism, such as an application installed on the user device 110 or another device (e.g., a smartphone associated with the user 112). In some embodiments, the alert(s) can be sent to a set of devices to ensure that an alert would reach at least one device that the malicious wireless access point 114 did not compromise. In response to an alert, the user 112 can manually disconnect the affected device(s) (e.g., the user device 110) from the malicious wireless access point 114. If active interference actions are to be taken, the active interference module 212 can use, for example, one or both of two main techniques that are aimed at interfering with the attacker 102 to establish constant communication with the target devices. The first interference technique can include having the active interference module 212 connect to the malicious wireless access point 114 as a target device and send messages via a control channel. By sending many requests and responding slowly to the malicious wireless access point 114 messages, the control channel is overloaded and the malicious wireless access point 114 would fail to accept connection requests from the target devices. The second interference technique can cause interference with specific messages communicated to target devices from the malicious wireless access point 114. By identifying these messages, the active interference module 212 can send messages that would make it impossible for the malicious wireless access point 114 to decode the messages. In this manner, the malicious wireless access point 114 cannot extract sensitive information from the target devices it hijacked. The mitigation component 202 can issue an alert to the user 112 as described above. The user 112 can check the area for a suspicious vehicle and/or person, which may cause the attacker 102 to leave the user premises 108. This interference process assumes a short period of few minutes until the attacker 102 gives up and leaves.

From operation 412, the method 400 proceeds to operation 414. The method 400 can end at operation 414.

Figure 5:
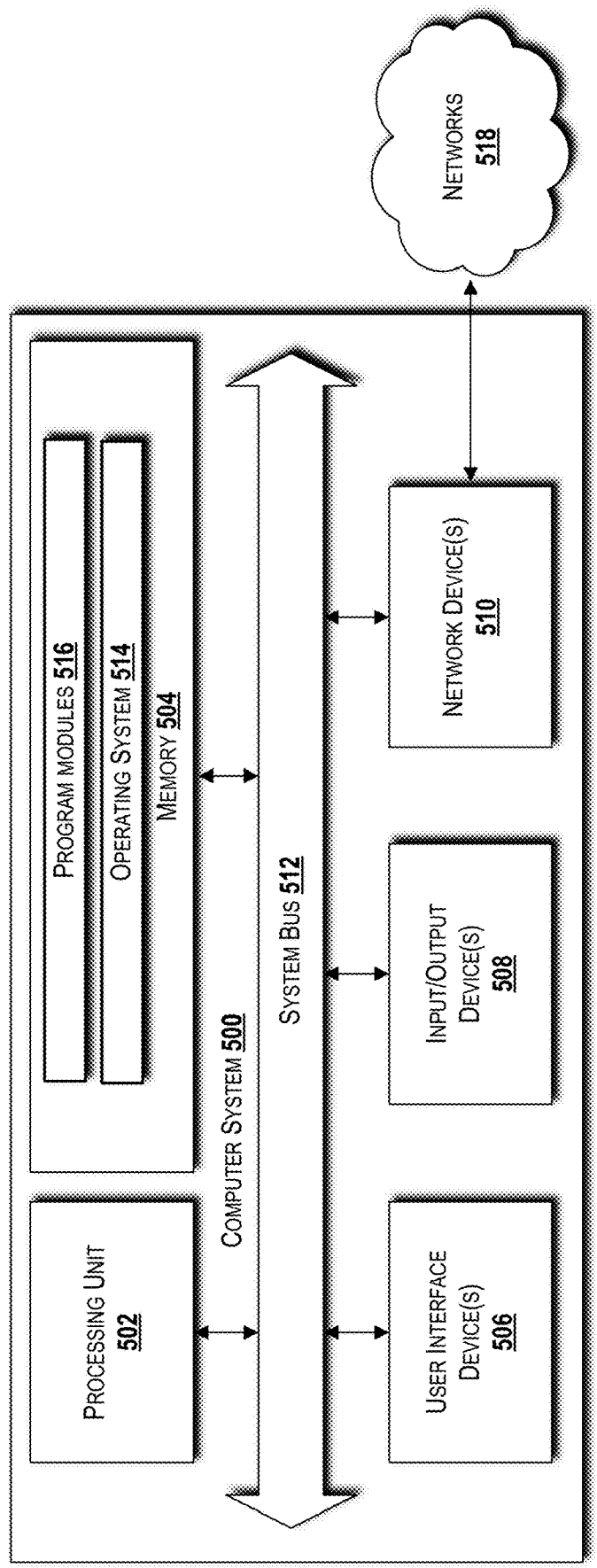
FIG. 5 is a block diagram illustrating an example computer system capable of implementing aspects of the concepts and technologies disclosed herein.

Turning now to FIG. 5, a block diagram illustrating a computer system 500 configured to provide the functionality described herein in accordance with various embodiments. In some embodiments, aspects of the user device 110, the benign wireless access point 104, the malicious wireless access point 114, the APIP system 128, one or more systems operating on or in communication with the benign wireless network 106, and/or one or more systems operating on or in communication with the malicious wireless network(s) 116 can be configured the same as or similar to the computer system 500.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 502 can be a single processing unit or a multiple processing unit that includes more than one processing component. Processing units are generally known, and therefore are not described in further detail herein.

The memory 504 communicates with the processing unit 502 via the system bus 512. The memory 504 can include a single memory component or multiple memory components. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, a member of the ANDROID OS family of operating systems from GOOGLE LLC, the FREEBSD family of operating systems, the SOLARIS family of operating systems from ORACLE CORPORATION, other operating systems, and the like.

The program modules 516 may include various software and/or program modules described herein. The program modules 516 can include, for example, the access point scanner module 204 (and associated sub-modules), the active connector module 206, the device tracker module 208, the alert module 210, and the active interference module 212 in an embodiment of the APIP system 128 configured the same as or similar to the computer system 500. In some embodiments, multiple implementations of the computer system 500 can be used, wherein each implementation is configured to execute one or more of the program modules 516. The program modules 516 and/or other programs can be embodied in computer-readable media containing instructions that, when executed by the processing unit 502, perform the method 400 described herein. According to embodiments, the program modules 516 may be embodied in hardware, software, firmware, or any combination thereof. The memory 504 also can be configured to store data described herein, such as the PNL 120, the active time 310, the SSID name 312, the vendor/model 314, the authentication requirement 316, the signal strength 318, the analysis results 320, the benign score(s) 324, and the malicious score(s) 326.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, a touch-sensitive surface, or an electronic stylus. Further, the I/O devices 508 may include one or more output devices.

The network devices 510 enable the computer system 500 to communicate with one or more networks 518, such as the benign wireless access network 106 and the malicious wireless network(s) 116 described herein. Examples of the network devices 510 include, but are not limited to, a modem, a radio frequency ("RF") or infrared ("IR") or ultraviolet ("UV") transceiver, a telephonic interface, a bridge, a router, or a network card. The network 518 may include a WLAN, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 518 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
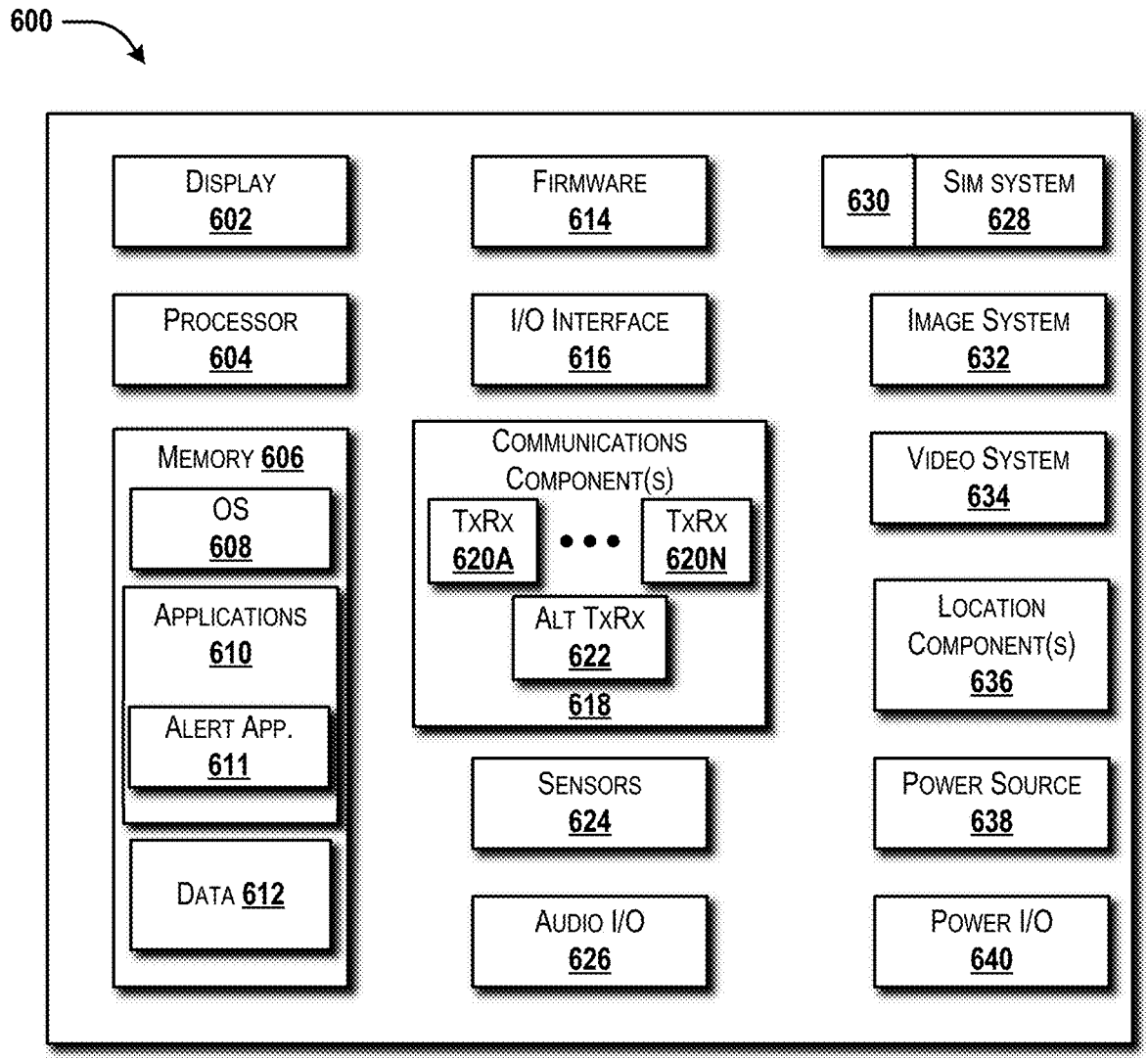
FIG. 6 is a block diagram illustrating an example mobile device capable of implementing aspects of the concepts and technologies disclosed herein.

Turning now to FIG. 6, an illustrative mobile device 600 and components thereof will be described. In some embodiments, the user device 110 can be configured the same as or similar to the mobile device 600. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 600 can also include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in the memory 606, or the like. The applications 610 can include, for example, an alert application 611 that can receive one or more alerts from the APIP system 128 when the APIP system 128 determines that a threat exists to the user device 110 and/or one or more other devices associated with the user 112. In some embodiments, the applications 610 can also include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, a member of the TIZEN OS family of operating systems from THE LINUX FOUNDATION, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering/deleting data, entering and setting user IDs and passwords for device access, configuring settings, manipulating content and/or settings, multimode interaction, interacting with other applications 610, and otherwise facilitating user interaction with the operating system 608, the applications 610, and/or other types or instances of data 612 that can be stored at the mobile device 600.

The applications 610, the data 612, and/or portions thereof can be stored in the memory 606 and/or in a firmware 614, and can be executed by the processor 604. The firmware 614 can also store code for execution during device power up and power down operations. It can be appreciated that the firmware 614 can be stored in a volatile or non-volatile data storage device including, but not limited to, the memory 606 and/or a portion thereof.

The mobile device 600 can also include an input/output ("I/O") interface 616. The I/O interface 616 can be configured to support the input/output of data such as location information, presence status information, user IDs, passwords, and application initiation (start-up) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, wearables, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 can also include a communications component 618. The communications component 618 can be configured to interface with the processor 604 to facilitate wired and/or wireless communications with one or more networks, such as the benign wireless network 106, the malicious wireless network(s) 116, the network(s) 518, or some combination thereof. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments, one or more of the transceivers of the communications component 618 may be configured to communicate using GSM, CDMA CDMAONE, CDMA2000, LTE, and various other 2G, 2.5G, 3G, 4G, 4.5G, 5G, 6G, 7G, and greater generation technology standards. Moreover, the communications component 618 may facilitate communications over various channel access methods (which may or may not be used by the aforementioned standards) including, but not limited to, TDMA, FDMA, CDMA, W-CDMA, OFDMA, SDMA, and the like.

In addition, the communications component 618 may facilitate data communications using GPRS, EDGE, the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, 5G technologies and standards, and various other current and future wireless data access technologies and standards. In the illustrated embodiment, the communications component 618 can include a first transceiver ("TxRx") 620A that can operate in a first communications mode (e.g., GSM). The communications component 618 can also include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 can also include an alternative transceiver ("Alt TxRx") 622, such as the WLAN component(s) 112, for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 can also facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 can also include one or more sensors 624. The sensors 624 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 can also include a subscriber identity module ("SIM") system 628. The SIM system 628 can include a universal SIM ("USIM"), a universal integrated circuit card ("UICC"), embedded SIM ("eSIM"), and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Additionally, or alternatively, an embedded SIM may be used. Because other devices and/or modules for identifying users and/or the mobile device 600 are contemplated, it should be understood that these embodiments are illustrative, and should not be construed as being limiting in any way.

The mobile device 600 can also include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another device. The video and/or photo content can also be shared with other devices via various types of data transfers via wired and/or wireless communication devices as described herein.

The mobile device 600 can also include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 can also be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 can also include a power source 638. The power source 638 can include one or more batteries, power supplies, power cells, and/or other power subsystems including alternating current ("AC") and/or direct current ("DC") power devices. The power source 638 can also interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 500 described above with reference to FIG. 5. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software also components presented herein. It is contemplated that the mobile device 600 may not include all of the components shown in FIG. 6, may include other components that are not explicitly shown in FIG. 6, or may utilize an architecture completely different than that shown in FIG. 6.

Figure 7:
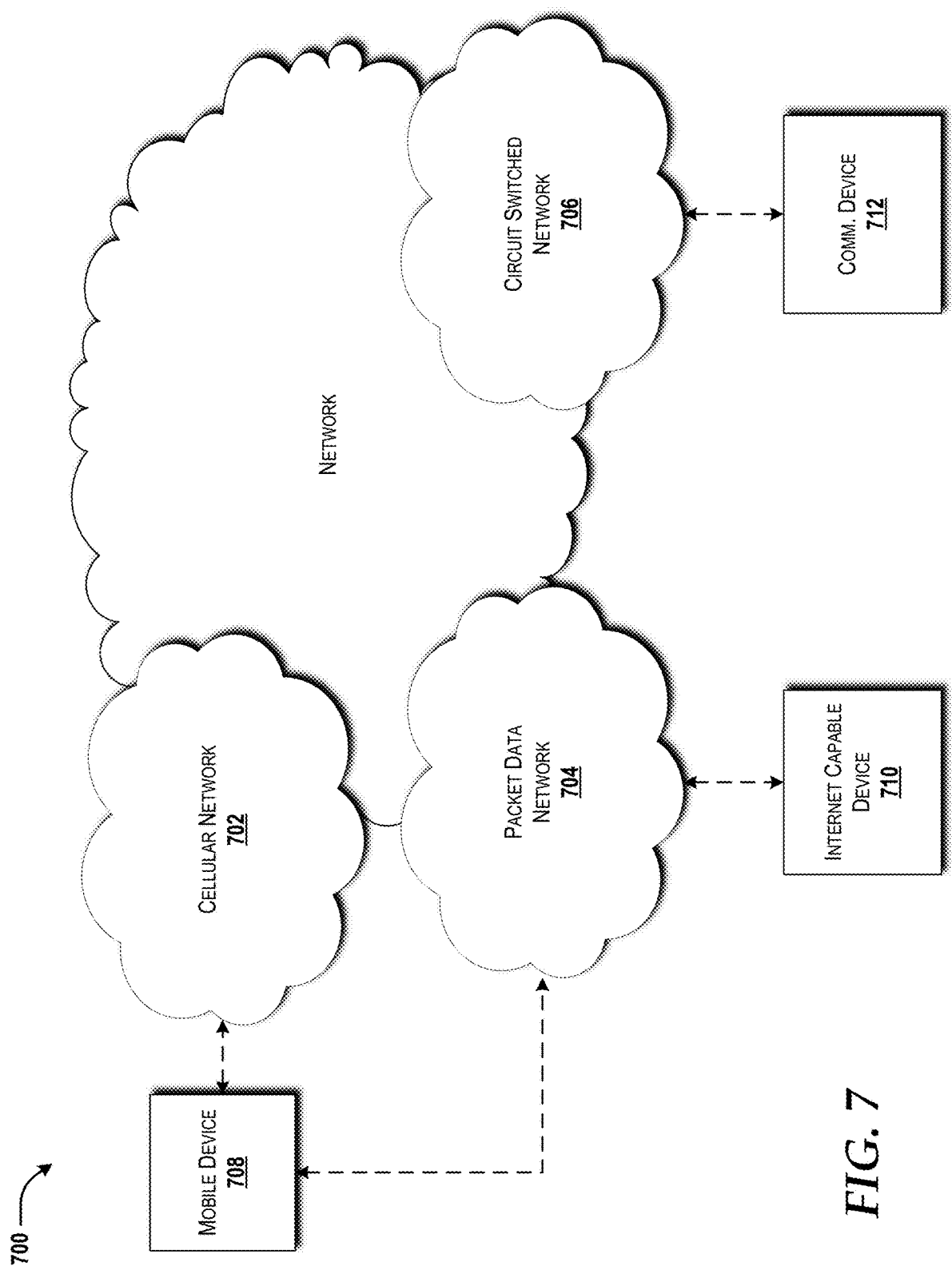
FIG. 7 is a block diagram illustrating an example network capable of implementing aspects of the concepts and technologies disclosed herein.

Turning now to FIG. 7, details of a network 700 are illustrated, according to an illustrative embodiment. The network 700 includes a cellular network 702, a packet data network 704, and a circuit switched network 706. The cellular network 702 includes various components such as, but not limited to, base stations, base transceiver stations ("BTSs"), node Bs ("NBs"), eNBs, gNBs, base station controllers ("BSCs"), radio network controllers ("RNCs"), mobile switching centers ("MSCs"), mobility management entities ("MMEs"), serving gateways ("SGWs"), packet data gateways ("PDGs"), evolved PDGs ("ePDGs"), AAA servers, home subscriber servers, short message service centers ("SMSCs"), multimedia messaging service centers ("MMSCs"), home location registers ("HLRs"), visitor location registers ("VLRs"), charging platforms, billing platforms, voicemail platforms, GPRS core network components, EPC core network components, future generation core network components, location service nodes, virtualizations thereof, combinations thereof, and/or the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, the user device 110, the mobile device 600, a cellular telephone, a user equipment, a mobile terminal, a PDA, a laptop computer, a handheld computer, and combinations thereof, can be operatively connected to the cellular network 702 and/or the packet data network 704. The mobile communications device 708 can be configured similar to or the same as the mobile device 600 described above with reference to FIG. 6.

The cellular network 702 can be configured as a GSM network and can provide data communications via GPRS and/or EDGE. Additionally, or alternatively, the cellular network 702 can be configured as a 3G UMTS network and can provide data communications via the HSPA protocol family, for example, HSDPA, EUL, and HSPA+. The cellular network 702 also is compatible with mobile communications standards such as LTE, 5G-NR, or the like, as well as evolved and future mobile standards.

The packet data network 704 includes various systems, devices, servers, computers, databases, and other devices in communication with one another, as is generally known. In some embodiments, the packet data network 704 is or includes one or more WI-FI networks, such as the benign wireless network 106 and the malicious wireless network(s) 116, each of which can include one or more WI-FI access points such as the benign wireless access point 104 and the malicious wireless access point 114. The packet data network 704 also can include routers, switches, and other WI-FI network components. The packet data network 704 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable systems/devices 710 such as a laptop, a portable device, or another suitable device, can communicate with one or more cellular networks 702, and devices connected thereto, through the packet data network 704. It also should be appreciated that the mobile communications device 708, such as the user device 110 or the mobile device 600, can communicate directly with the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Figure 8:
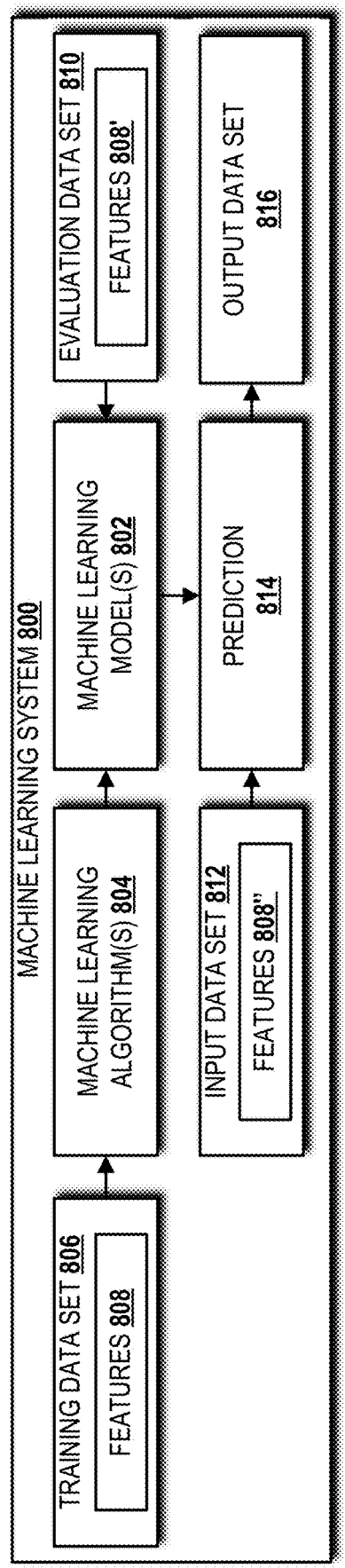
FIG. 8 is a block diagram illustrating an example machine learning system capable of implementing aspects of the concepts and technologies disclosed herein.

Turning now to FIG. 8, a machine learning system 800 capable of implementing aspects of the embodiments disclosed herein will be described. The machine learning classifier 320 described above can be implemented by the machine learning system 800. In some embodiments, the APIP system 128 can include the machine learning system 800. In other embodiments, the APIP system 128 can operate in communication with the machine learning system 800 that implements the machine learning classifier 320.

The illustrated machine learning system 800 includes one or more machine learning models 802. The machine learning models 802 can include unsupervised, supervised, and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein.

Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected by machine learning modelers at the direction of an entity (e.g., a device manufacturer, ISP, other service provider, or the user 112). Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater the number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data set 806 can be adjusted to zero.

The machine learning system 800 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that aspects of protecting against wireless access point impersonation have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An access point impersonation protection system comprising:
   a processor; and
   a memory comprising instructions that, when executed by the processor, cause the processor to perform operations comprising
      scanning for wireless network signals to detect a wireless network provided by an access point, wherein the access point is associated with a user premises, wherein the user premises comprises a first user device and a gateway, and wherein the access point impersonation protection system is part of the gateway,
      collecting a network feature associated with the wireless network,
      analyzing the network feature to determine analysis results, wherein analyzing the network feature comprises
         receiving an SSID name from the access point,
         determining that the SSID name is a common public SSID name,
         determining a location of the access point,
         determining that the location of the access point does not correspond with a location associated with the common public SSID name, and
         in response to determining that the location of the access point does not correspond with the location associated with the common public SSID name, determining, for the analysis results, that the access point has a higher likelihood of being malicious than benign, acting as a second user device attempting to connect to the access point in order to connect to the access point to determine further analysis results, after connecting to the access point,
observing activity of the access point to determine if the access point attempts to access the access point impersonation protection system acting as the second user device, and if the access point attempts to access the access point impersonation protection system acting as the second user device, determining, for the further analysis results, that the access point has a higher likelihood of being malicious than benign, providing the analysis results and the further analysis results to a machine learning classifier that assigns, based at least in part upon the analysis results and the further analysis results, a classification to the access point, wherein the classification comprises a benign classification or a malicious classification, receiving, from the machine learning classifier, the classification of the access point, wherein the classification of the access point comprises the malicious classification, and executing, based at least in part on the malicious classification of the access point, an interference action, wherein the interference action comprises
connecting to the access point associated with the malicious classification, and
overloading the access point with messages to cause connection requests from the first user device to the access point to fail.

2. The access point impersonation protection system of claim 1, wherein the network feature comprises an active time of the access point, the SSID name, a vendor, a model, a signal strength, or an authentication requirement.

3. The access point impersonation protection system of claim 2, wherein analyzing the network feature further comprises:
determining whether the active time of the access point is below an active time threshold; and
in response to determining that the active time is below the active time threshold, determining that the access point has a higher likelihood of being malicious than benign.

4. The access point impersonation protection system of claim 2, wherein analyzing the network feature further comprises:
determining whether the vendor or the model of the access point is on a black list; and
in response to determining that the vendor or the model is on the black list, determining that the access point has a higher likelihood of being malicious than benign.

5. The access point impersonation protection system of claim 2, wherein analyzing the network feature further comprises:
determining the authentication requirement; and
in response to determining that the authentication requirement does not meet an authentication requirement minimum, determining that the access point has a higher likelihood of being malicious than benign.

6. The access point impersonation protection system of claim 2, wherein analyzing the network feature further comprises:
determining whether the signal strength is above a signal strength threshold; and
in response to determining that the signal strength is above the signal strength threshold, determining that the access point has a higher likelihood of being malicious than benign.

7. The access point impersonation protection system of claim 1, wherein analyzing the network feature further comprises in response to determining that the SSID name is a common public SSID name, determining that the access point has a higher likelihood of being malicious than benign.

8. A method comprising:
scanning, by an access point impersonation protection system comprising a processor, for wireless network signals to detect a wireless network provided by an access point, wherein the access point is associated with a user premises, wherein the user premises comprises a first user device and a gateway, and wherein the access point impersonation protection system is part of the gateway;

collecting a network feature associated with the wireless network;

analyzing, by the access point impersonation protection system, the network feature to determine analysis results, wherein analyzing the network feature comprises
receiving an SSID name from the access point,
determining that the SSID name is a common public SSID name,
determining a location of the access point,
determining that the location of the access point does not correspond with a location associated with the common public SSID name, and
in response to determining that the location of the access point does not correspond with the location associated with the common public SSID name, determining, for the analysis results, that the access point has a higher likelihood of being malicious than benign;

acting, by the access point impersonation protection system, as a second user device attempting to connect to the access point in order to connect to the access point to determine further analysis results;

after connecting to the access point,
observing, by the access point impersonation protection system, activity of the access point to determine if the access point attempts to access the access point impersonation protection system acting as the second user device, and if the access point attempts to access the access point impersonation protection system acting as the second user device, determining, by the access point impersonation protection system, for the further analysis results, that the access point has a higher likelihood of being malicious than benign;

providing, by the access point impersonation protection system, the analysis results and the further analysis results to a machine learning classifier that assigns, based at least in part upon the analysis results and the further analysis results, a classification to the access point, wherein the classification comprises a benign classification or a malicious classification;

receiving, by the access point impersonation protection system, from the machine learning classifier, the classification of the access point, wherein the classification of the access point comprises the malicious classification; and executing, based at least in part on the malicious classification of the access point, an interference action, wherein the interference action comprises
connecting to the access point associated with the malicious classification, and
overloading the access point with messages to cause connection requests from the first user device to the access point to fail.

9. The method of claim 8, wherein the network feature comprises an active time of the access point, the SSID name, a vendor, a model, a signal strength, or an authentication requirement.

10. The method of claim 9, wherein analyzing the network feature further comprises:
determining whether the active time of the access point is below an active time threshold; and
in response to determining that the active time is below the active time threshold, determining that the access point has a higher likelihood of being malicious than benign.

11. The method of claim 9, wherein analyzing the network feature further comprises:
determining whether the vendor or the model of the access point is on a black list; and
in response to determining that the vendor or the model is on the black list, determining that the access point has a higher likelihood of being malicious than benign.

12. The method of claim 9, wherein analyzing the network feature further comprises:
determining the authentication requirement; and
in response to determining that the authentication requirement does not meet an authentication requirement minimum, determining that the access point has a higher likelihood of being malicious than benign.

13. The method of claim 9, wherein analyzing the network feature further comprises:
determining whether the signal strength is above a signal strength threshold; and
in response to determining that the signal strength is above the signal strength threshold, determining that the access point has a higher likelihood of being malicious than benign.

14. The method of claim 8, wherein analyzing the network feature further comprises in response to determining that the SSID name is a common public SSID name, determining that the access point has a higher likelihood of being malicious than benign.

15. A computer-readable storage medium comprising computer-executable instructions that, when executed by a processor of an access point impersonation protection system, cause the processor to perform operations comprising:
scanning for wireless network signals to detect a wireless network provided by an access point, wherein the access point is associated with a user premises, wherein the user premises comprises a first user device and a gateway, and wherein the access point impersonation protection system is part of the gateway;
collecting a network feature associated with the wireless network;
analyzing the network feature to determine analysis results, wherein analyzing the network feature comprises
receiving an SSID name from the access point,
determining that the SSID name is a common public SSID name,
determining a location of the access point,
determining that the location of the access point does not correspond with a location associated with the common public SSID name, and
in response to determining that the location of the access point does not correspond with the location associated with the common public SSID name, determining, for the analysis results, that the access point has a higher likelihood of being malicious than benign;
acting as a second user device attempting to connect to the access point in order to connect to the access point to determine further analysis results;
after connecting to the access point,
observing activity of the access point to determine if the access point attempts to access the access point impersonation protection system acting as the second user device, and
if the access point attempts to access the access point impersonation protection system acting as the second user device, determining, for the further analysis results, that the access point has a higher likelihood of being malicious than benign;
providing the analysis results and the further analysis results to a machine learning classifier that assigns, based at least in part upon the analysis results and the further analysis results, a classification to the access point, wherein the classification comprises a benign classification or a malicious classification;
receiving, from the machine learning classifier, the classification of the access point; and
executing, based at least in part on the malicious classification of the access point, an interference action, wherein the interference action comprises
connecting to the access point associated with the malicious classification, and
overloading the access point with messages to cause connection requests from the first user device to the access point to fail.

16. The computer-readable storage medium of claim 15, wherein the network feature comprises an active time of the access point, the SSID name, a vendor, a model, a signal strength, or an authentication requirement.

17. The computer-readable storage medium of claim 16, wherein analyzing the network feature further comprises:
determining whether the active time of the access point is below an active time threshold; and
in response to determining that the active time is below the active time threshold, determining that the access point has a higher likelihood of being malicious than benign.

18. The computer-readable storage medium of claim 16, wherein analyzing the network feature further comprises:
determining whether the vendor or the model of the access point is on a black list; and
in response to determining that the vendor or the model is on the black list, determining that the access point has a higher likelihood of being malicious than benign.

19. The computer-readable storage medium of claim 16, wherein analyzing the network feature further comprises:
determining the authentication requirement; and
in response to determining that the authentication requirement does not meet an authentication requirement minimum, determining that the access point has a higher likelihood of being malicious than benign.

20. The computer-readable storage medium of claim 15, wherein analyzing the network feature comprises in response to determining that the SSID name is a common public SSID name, determining that the access point has a higher likelihood of being malicious than benign.

* * * * *